US008548966B2

(12) United States Patent
Vechev et al.

(10) Patent No.: US 8,548,966 B2
(45) Date of Patent: Oct. 1, 2013

(54) ASYNCHRONOUS ASSERTIONS

(75) Inventors: Martin Vechev, Yorktown Heights, NY (US); Eran Yahav, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 228 days.

(21) Appl. No.: 13/004,506

(22) Filed: Jan. 11, 2011

(65) Prior Publication Data

US 2012/0179650 A1 Jul. 12, 2012

(51) Int. Cl.
*G06F 7/00* (2006.01)
*G06F 17/00* (2006.01)
(52) U.S. Cl.
USPC .......................................................... 707/701
(58) Field of Classification Search
USPC .......................................................... 707/701
See application file for complete search history.

(56) References Cited

U.S. PATENT DOCUMENTS

2006/0130010 A1* 6/2006 Rehof et al. .................. 717/136

OTHER PUBLICATIONS

Vechev, Martin, et al., PHALANX: Parallel Checking of Expressive Heap Assertions, ISMM'10, Jun. 5-6, 2010, pp. 41-50, Toronto, Ontario, Canada.

* cited by examiner

*Primary Examiner* — James Trujillo
*Assistant Examiner* — Jeffrey Chang
(74) *Attorney, Agent, or Firm* — Scully, Scott, Murphy & Presser, P.C.; Louis J. Percello, Esq.

(57) ABSTRACT

A snapshot of an application executing on a processor is taken in response to detecting an assertion in a running application. The assertion is evaluated based on the snapshot asynchronously while allowing the application to continue executing. The results of the assertion evaluation are returned to the application.

19 Claims, 5 Drawing Sheets

```
processObject(o, sid) {
  if (o.sid ≠ null)
    o = o.sid;
  for each f ∈ o
    t = o.f;
  ...
}
```

```
writeBarrier(o, f, nv) {
  for each sid ∈ as
    if (o.sid = null)
      c = copyObj(o);
      break;
  for each sid ∈ as
    if (o.sid = null)
      o.sid = c;
  o.f = nv;
}
```

```
endSnapshot(sid) {
  as = as \ {sid};
  for each o ∈ aobj
    o.sid = null;
}
```

```
allocBarrier(o) {
  for each sid ∈ as
    o.sid = ⊥;
}
```

```
startSnapshot() {
  freesid = SnapIds \ as;
  if (freesid = ∅)
    return BUSY;
  pick sid ∈ freesid;
  as = as ∪ {sid};
}
```

FIG. 5

ASYNCHRONOUS ASSERTIONS

FIELD

The present application generally relates to computer systems and garbage collection, and more particularly to asynchronous assertions.

BACKGROUND

Modern object-oriented programs make heavy and extensive use of the heap. The causes of many program errors can be detected early if the developer is given the opportunity to check heap related assertions at specific program points. Unfortunately, while checking heap invariants during program execution can be useful, it can also be very expensive and can cause significant slowdowns. The problem is that the program execution must be stopped while the heap assertion is being checked.

Assertions are a powerful technique for program monitoring and bug detection. Traditional general purpose assertion checking, however, is currently considered too expensive to be of practical use. Indeed, as assertion checking is performed synchronously, regardless of how well one optimizes their assertion checking code, it fundamentally imposes its full cost on the runtime of the program. In turn, this makes the process of writing assertion checks inherently burdensome and impractical as the programmer is now forced to continually estimate and limit the complexity and frequency of their assertion checks in order to avoid extreme slowdowns.

In this work, we propose asynchronous assertions. Asynchronous assertions allow program execution and assertion checking to proceed simultaneously: the program no longer needs to be stopped while the assertion is being evaluated. Furthermore, the semantics of a concurrently checked assertion may be the same as if the assertion were evaluated sequentially.

BRIEF SUMMARY

A method and system for asynchronous assertions may be provided. The method, in one aspect, may include detecting an asynchronous assertion in a program of instructions executing on a processor associated with an application. The method may also include creating a snapshot of the application in response to detecting the asynchronous assertion, the snapshot of the application including one or more register states of the processor associated with the application and memory states of memory used by the application. The method may further include allowing the program of instructions to continue executing and evaluating the asynchronous assertion based on the snapshot asynchronously to the program of instructions that continues to execute. The method may yet further include returning result of the evaluation to the program of instructions.

A system for asynchronous assertions, in one aspect, may include one or more processor and an application running on the one or more processors. The system may also include a module operable to detect an asynchronous assertion in the application and further operable to create a snapshot of the application in response to detecting the asynchronous assertion. The snapshot of the application may include one or more register states of the processor associated with the application and memory states of memory used by the application. The module may be further operable to evaluate the asynchronous assertion based on the snapshot asynchronously to the application that continues to execute, and return result of the evaluation to the application.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIG. 5 shows example procedures or functionalities in one embodiment of the present disclosure that support snapshots.

DETAILED DESCRIPTION

Asynchronous Assertions

Figure 1:
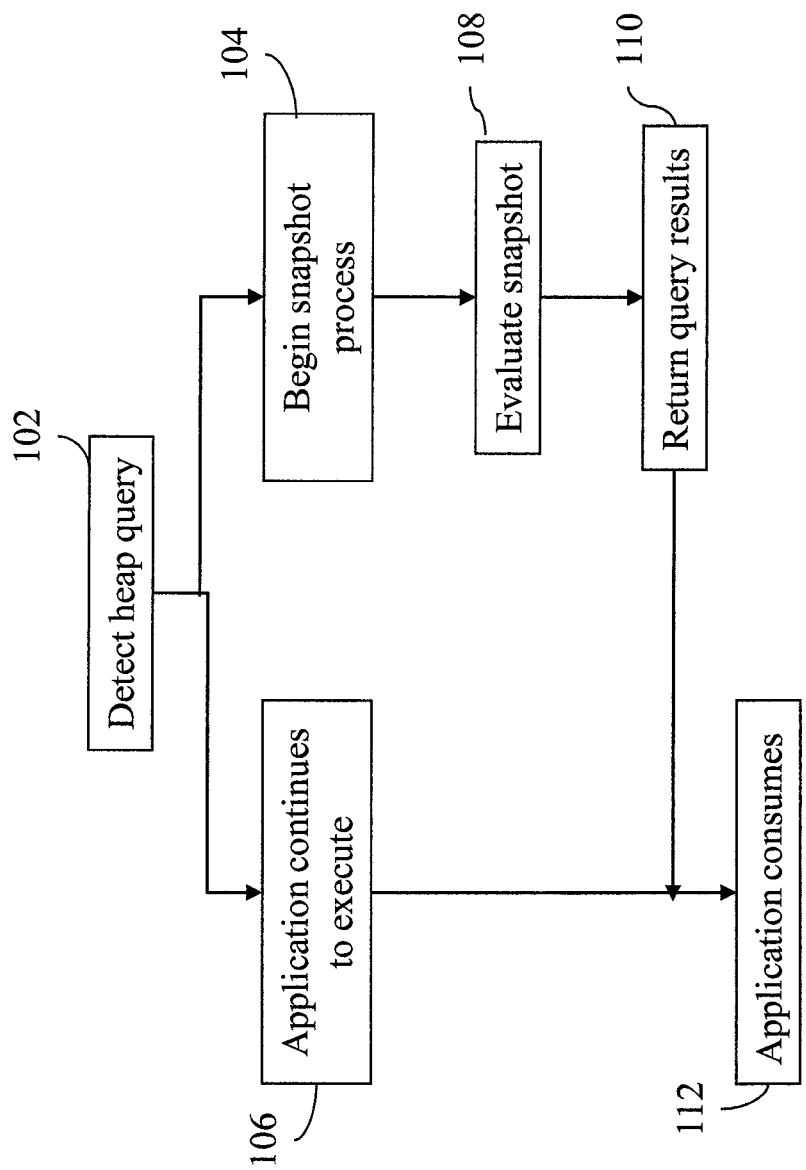
FIG. 1 is a flow diagram that illustrates method logic of the present disclosure in one embodiment.

In the present disclosure, we present asynchronous assertions. The idea behind asynchronous assertions in one embodiment is to allow assertion evaluation to proceed without stopping the application. With this approach, the program issues an assertion and immediately continues its execution, while another thread evaluates the assertion in the background. With asynchronous assertions, the cost of an assertion check is no longer imposed on the program runtime, thereby allowing developers to write arbitrarily complex assertions, and removing a significant roadblock towards making dynamic assertion checking practical.

Our work disclosed in the present disclosure differs from prior work on pushing program monitoring and analysis into a separate thread at least in two ways. First, these approaches cannot be used to check arbitrarily complex properties as they lack a general mechanism for ensuring that helper threads see a consistent snapshot of the program state. Second, these systems mostly target low-level memory bugs, such as out-of-bounds pointer and array accesses and uninitialized reads, and provide specific solutions for each of these low level properties.

Snapshots for Asynchrony

Our approach in embodiment constructs snapshots incrementally by saving the relevant program state right before the application modifies it. The assertion checking code is compiled to be aware of the copies of the program state, giving the illusion of a monolithic snapshot. As a result, asynchronous assertions always produce the same result as they would in a serial execution. The challenge in implementing this approach lies with correctly and efficiently managing multiple snapshots for multiple concurrent assertion checks. Since the state of modern programs resides mostly in the heap, we focus attention on challenging heap properties.

Programming Model

We view the evaluation of an asynchronous assertion as a kind of future. In this model, when the program executes an assertion, it starts the concurrent check and immediately returns a future—a handle to its future result. The program can later force the evaluation of the future, blocking until the check is complete. If the programmer does not force its evaluation, the assertion check also completes asynchronously at some future time. The challenge for programmers is placing the assertions in a way that they have enough time to execute before critical code that depends on their results.

While the interface we provide is similar to futures, it is noted that an assertion in one embodiment is always evaluated on a consistent snapshot of the program state.

The actual assertions may include ordinary Java™ code (such as a repOk or invariant method) marked with an annotation that the system recognizes.

Evaluation

Our implementation, which we call STROBE, is a snapshot-based system for supporting asynchronous assertion checking. STROBE in one embodiment is implemented in the Jikes RVM Java virtual machine and successfully runs both single- and multi-threaded Java applications. The two mechanisms are (a) a copy-on-write write barrier in the application code that builds a snapshot of the global state for each concurrently running assertion, and (b) a read barrier in the assertion code that forwards reads to the snapshots. Our evaluation of STROBE focuses on exploring the performance characteristics of this mechanism across a range of conditions. We systematically vary the frequency of the assertion checks, the cost of individual assertion checks, and the number of dedicated assertion checker threads. We find that asynchronous checking scales well over synchronous checking, and in many cases enables kinds of assertions (complex or very frequent) that would otherwise be impractical.

In the present disclosure, we present asynchronous assertions, assertions that are evaluated concurrently without stopping the application, but guarantee the same result as sequential evaluation. An efficient implementation of our technique in a system is referred to as STROBE. We also present an evaluation of STROBE on a number of realistic usage scenarios. Our results indicate that STROBE works well in practice: it scales almost perfectly over synchronous checking, and can execute a range of intensive assertion workloads with overheads under 2×.

In more details, in one aspect of the present disclosure, a method is provided that takes a snapshot of an application when a query for heap assertion issues. Briefly, a snapshot refers to data captured at a point in time. Generally, a snapshot is the state of a computer system at a particular point in time, for example, system configuration of information of a program or machine at a particular point. A snapshot may include, for example, a copy of memory including the contents of all memory bytes, hardware registers and status indicators, files, and the like, as they exist in a computer system at a particular point in time. An application snapshot may include the state and configuration of the application, data and objects of the application, memory state associated with the application, CPU usage of the application, etc., at the point in time when the snapshot is taken. Heap refers to memory allocated dynamically for a program to run and is separate from the memory that stores program code and stack of the running program. Heap assertion refers to commands or queries for checking heap properties such as ownership, sharing and reachability.

In the methodology of the present disclosure, the application may keep running while the snapshot is being taken. The method also may include performing an evaluation on the snapshot. In this way, the application need not be stopped for query evaluation, but can continue executing while the query evaluation takes place.

FIG. 1 is a flow diagram that illustrates method logic of the present disclosure in one embodiment. At 102, a heap assertion or query is detected, for example, by a processor. For instance, a programmer issues a query. This may be done, typically, by a programmer or the like inserting heap query statements in a computer program of instructions such as an application program. The application program runs and encounters a heap query statement during the program execution on a processor. Heap query statements may include the statements described in the following paper, which is incorporated herein by reference: "PHALANX: Parallel Checking of Expressive Heap Assertions" by Martin Vechev, Eran Yahav, and Greta Yorsh, International Symposium on Memory Management, Proceedings of the 2010 international symposium on Memory management 2010, Toronto, Ontario, Canada, Pages: 41-50.

At 104, in response to encountering a heap query statement, the snapshot process begins and the query returns. Taking a snapshot of the application may include making a copy of one or more register states of the processor running the application and a copy of heap memory used by the application.

Portability: Our algorithms in one embodiment of the present disclosure are not specific to a particular virtual machine (VM) and hence can be implemented in any VM desiring support for heap assertions, e.g., Javascript, C#, etc. The algorithms in one embodiment of the present disclosure are designed to use standard components already present in these VMs, such as heap traversal machinery, synchronization primitives, auxiliary object data. The algorithms can take advantage of existing efficient implementation of these components, e.g., load balancing, and future advances in their technology. Moreover, we designed the algorithms in a way where any work done for query evaluation can be reused for garbage collection. We designed the algorithms to leverage available cores in the system for speeding up heap queries in one embodiment of the present disclosure. The algorithms operate efficiently in both sequential and parallel settings. A single heap query can be computed by a single thread or by multiple threads, if available.

At 106, the application program keeps executing while the query is evaluated at 108. The evaluation may include one or more of the following queries.

At some point later in the application program execution, the query returns a result, as shown at 110. This point is either when assertion evaluation completes, or when the programmer forces the evaluation of an assertion by calling force( ).

That result may be consumed by the application at some later point as shown at 112. That is, the application may make use of the results, for example, output the results for notifying the programmer.

Figure 2:
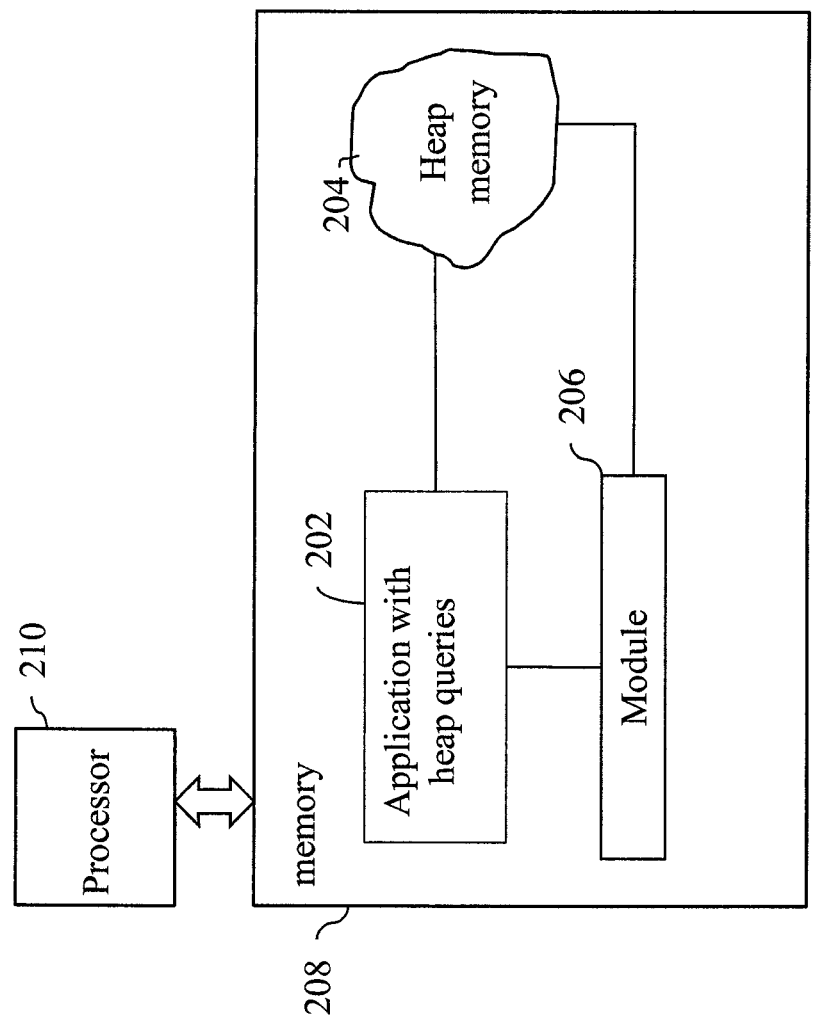
FIG. 2 is a system diagram illustrating components in one embodiment of the present disclosure.

FIG. 2 is a system diagram illustrating components in one embodiment of the present disclosure. A programmer may utilize an asynchronous assertions API, introduced as a library to be used with an application. An application program 202 is loaded into memory 208 and executed by a processor 210. Heap memory 204 is allocated for use by the application program 202 in the course of its execution. A module 206 of the present disclosure also may be loaded into memory 208 and executed by a processor 210. The module 206 detects heap queries issued in the application program 202, for example, to query the information about the heap memory 204. In response to detecting a heap query, the module 206 takes a snapshot of the heap memory 204. The module 206 also may perform evaluations on the snapshot, for example, perform the specified heap queries as explained above. The module 206 sends the evaluation results or such information to the application program 202. While the module 206 takes the snapshot and performs evaluation, the application program 202 may continue keep executing.

We illustrate the operation of asynchronous assertion checking on a simple example. Then, we briefly demonstrate as an example how the assertions are used in the development of a classic data structure (red-black tree).

Consider the program excerpt shown in Code Example 1 below.

```
1: N a = new N( ); // A
2: N b = new N( ); // B
3: N c = new N( ); // C
4: a.n = b;
5: b.n = c;                    boolean reach(N a,N b) {
6: assert(reach(a,c));            while (a != null) {
7: b.n = null;                        if (a == b)
8: assert(reach(a,c));                   return true;
9: N d = new N( ); // D               a = a.n;
10: d.n = c;                       }
11: a.n = d;                       return false;
...                             }
```

Code Example 1. A Simple Example with Assertions Checking Reachability.

The program first creates three new objects, and creates references between them. Then, it checks whether we can reach the last object from the first via the assertion in line 6. The code for reach is also shown: it iterates over the list and checks whether we can reach one object from another. Such assertion checks can be realized in the language runtime as in the case of Phalanx, or as a separate procedure in the program. In either case, the example restricts the assertion to only allow reads of the shared state, and not modifications. In our example, in a serial execution of the program, the assertion at line 6 will pass, while the assertion at line 8 will fail.

Using Asynchronous Assertions

To use asynchronous assertions as provided by STROBE, we rewrite the code of Example 1 to use the future-like API of asynchronous assertions, as shown in Code Example 2.

```
6: AsyncAssert r1 = new AsyncReachAssert(a, c);
7: b.n = null;
8: AsyncAssert r2 = new AsyncReachAssert(a, c);
9: N d = new N( );
10: d.n = c;
11: a.n = d;
AsyncReachAssert<T> extends AsyncAssert {
    boolean evaluate(T x, T y) {
        return reach(x,y);
    }
}
```

Code Example 2. The Example of Code Example 1 Using Asynchronous Assertions. Lines 1-5 are Omitted.

Using STROBE, the evaluation of both assertions can proceed concurrently with the program and with other in-flight assertions. Furthermore, regardless of the concurrent interleaving between the program and the assertions, the assertions produce the same result as if they were executed in a synchronous manner.

Evaluation of Asynchronous Assertions

Figure 4:
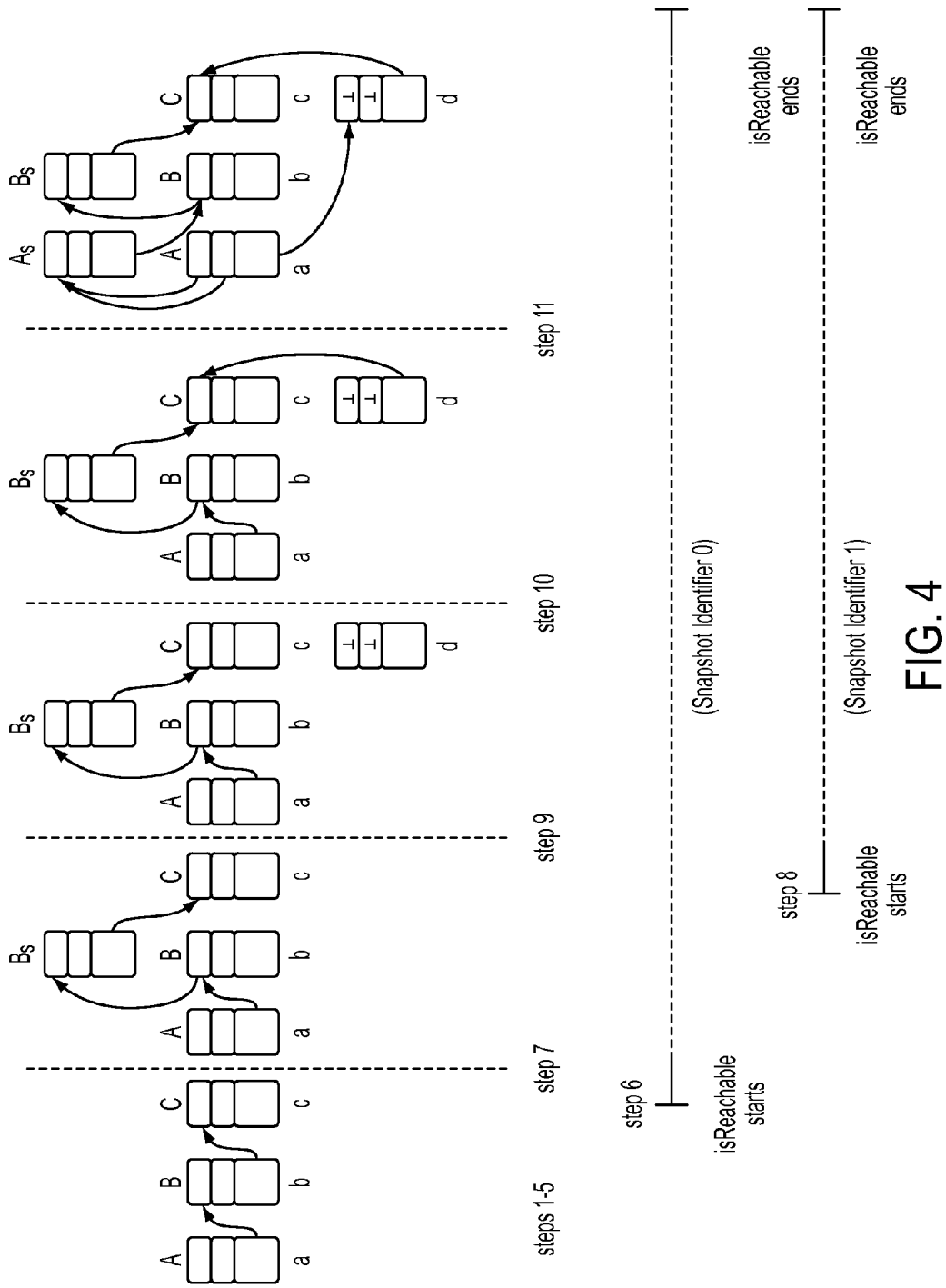
FIG. 4 shows evaluating asynchronous assertions of the present disclosure in one embodiment in an example program.

FIG. 4 shows (informally) how STROBE evaluates the asynchronous assertions in the program of Code Example 2. For this example, we assume that each object has three fields, the first two refer to potential snapshots of the object (one for each active assertion). We refer to these two fields as snapshot fields. The last field is the object field n. Generally, the number of snapshot fields is parametric, and there could be more than two snapshot fields.

In FIG. 4, we depict objects as rectangles having the three aforementioned fields. For each object, we write the name of the local variable that points to it under the object node. For presentation purposes, we label each object with a name shown above the object node.

The program starts by executing the statements up to and including line 5, resulting in a state where object A points to B which points to C.

First Asynchronous Assertion

In the next step, the asynchronous assertion of line 6 is invoked. STROBE starts the assertion in a separate thread and assigns to it a unique snapshot identifier 0 (we refer to this assertion as assertion 0). Assertion 0 begins execution, and the thread executing it is immediately preempted before processing any objects. Next the program executes the statement at line 7 which stores null in the n field of object B. Because there is an active assertion (assertion 0), a snapshot of object B is now taken (the copy is called $B_s$), and the snapshot field 0 is updated to hold a pointer to the snapshot copy $B_s$. That is, in one embodiment, the copy of B is created on the execution of line 7, that assigns null to its "next" field. Since the content of the object B is modified (b.n=null) and we wish to reason on the old content in the snapshot, we create a copy of B. There is no need to copy A and C in this case, as their content is not modified by (b.n=null) and remains the same, i.e., because B is the only object that changed after the assertion started running in this example. The object A, C and $B_s$, represent the content when the assertion started.

Second Asynchronous Assertion

The program proceeds to execute line 8, invoking another asynchronous assertion (assigned snapshot identifier 1). The new assertion starts executing, but the thread executing it may be preempted before processing any objects. In another embodiment, the thread need not be preempted.

Newly Allocated Objects

Execution proceeds, and at line 9, a new object D is allocated. Newly allocated objects are not seen by in-flight assertions as these new objects were not part of the program state when the assertions started. This invariant is ensured because whenever we store a reference to a new object in another existing object, the existing object is snapshotted (and as we will see, assertions use the snapshotted copy). However, we would also like new objects to not be snapshotted (as they will not be encountered by the assertion). Hence, at allocation time, the snapshot fields of all active assertions are updated with a special symbol ⊥ to denote that the object is considered newly allocated for in-flight active assertions. In our case, there are two active assertions (0 and 1), and correspondingly their two snapshot fields are set to ⊥. At step 10, the newly allocated object is updated. However, the object is not snapshotted for either of the two in-flight assertions 0 and 1, as the object was allocated when the assertions were still active.

Traversal through Snapshotted Objects

The program completes step 11 and updates object A. Object A is now snapshotted (the snapshot copy is object $A_s$) with both active assertions now sharing the same snapshot copy $A_s$. It is generally not necessary that assertions share the same object snapshot, but in some cases, as in our example, this is possible. Indeed, this may be an effective space optimization that our system performs, whenever possible. In general an object can have more than one snapshot copy (each snapshot copy would belong to different in-flight assertions).

In our example, the two active assertions did not process objects while the program was updating them, but in general, assertions can interleave their execution with the program in an arbitrary way. That is, in our example, an assertion can start processing objects from any of the states.

If assertion 0 resumes its execution from the last state (after step 11), then it will first visit object A and observe that the snapshot field corresponding to its identifier is non-null (field index 0). It will then follow that reference and process the snapshot copy of A, i.e., $A_s$. Then, it will reach object B where once again it will observe that B has a snapshot copy $B_s$ (for that assertion). It will then follow the reference to the snapshot copy $B_s$ process $B_s$ (instead of B), and reach object C. Indeed, following the object path:

$$A \to A_s \to B \to B \to B_s \to C$$

will result in assertion 0 passing, the same result as if assertion 0 was executed synchronously after step 5. This is because the snapshot copies $A_s$ and $B_s$ contain the same contents as objects A and B right after step 5.

Now, if assertion 1 resumes its execution from the last state (after step 11), then it will first visit object A, and observe that the snapshot field corresponding to its identifier is non-null (field index 1). It will follow that reference and process the snapshot copy of A, i.e., $A_s$. Then, it will reach object B, where unlike assertion 0, it will observe that object B has not been snapshotted for assertion 1 (the corresponding snapshot field in object B is null). The n-field of object B is also null. Hence, following the object path:

$$A \to A_s \to B \to null$$

will result in assertion 1 failing, the same result as if assertion 1 was executed synchronously after step 7.

After an assertion completes, it cleans up its state: for all allocated objects, the corresponding field for that assertion is set to null. The snapshot objects can then be garbage collected like all other objects.

Custom Assertions

Consider the problem of implementing a complex sequential data structure such as a red-black tree, a self-balancing binary tree. It may be desirable to check that after a method on the data structure completes, certain post-conditions hold. A typical assertion check that a programmer may write is shown in Code Example 3. There, a procedure called checkAssertions is invoked, which in turn invokes a procedure traverseAndCheck that recursively iterates over the tree and checks various properties on the tree: whether the tree is balanced and ordered, and whether the coloring of the nodes is correct. Here, we assume that a node in the tree has the following fields with the obvious meaning: left, right, key, parent and color (that can range over RED and BLACK).

Normally, when the program calls the assertion checking procedure checkAssertions, it stops, the assertion is evaluated and then the program resumes. In this example, as the assertion is iterating over the whole tree, such a pause in the program execution can be substantial, especially if the assertion check is triggered at medium to high frequency. In contrast, with our approach, once checkAssertions is invoked, the program can immediately continue execution, without stopping and waiting for the result. The result of the assertion is delivered to the program when the assertion completes. As explained on the illustrative example, in one embodiment, every time a new assertion is triggered, logically, a new snapshot of the global state is created, and the assertion is evaluated on that snapshot. The performance overhead of our approach may depend on how long the assertion takes to complete and how many and what modifications to the global state occur during assertion evaluation.

Code Example 3. An Assertion Procedure that Performs Recursive Checking of Various Safety Properties on a Red-Black Tree.

```
int traverseAndCheck(Node n, Node p)
{
    if (n == null || n == nil)
        return 1;
    Node l = n.left;
    Node r = n.right;
    /* Recursive traversal: return count of BLACK nodes */
    int lb = traverseAndCheck(l, n);
    int rb = traverseAndCheck(r, n);
    /* Check that the tree is balanced */
    if (lb != rb || lb == -1)
        return -1;
    /* Check that the tree is ordered */
    Integer val = (Integer) n.key;
    if (l != nil && val <= (Integer) l.key)
        return -1;
    if (r != nil && val >= (Integer) r.key)
        return -1;
    /* Check colors */
    int c = n.color;
    if (c == RED && (l.color != BLACK || r.color != BLACK))
        return -1;
    return lb + (n.color == BLACK ? 1 : 0);
}
public boolean checkAssertions( )
{
    return (traverseAndCheck(root, nil) != -1);
}
```

Our approach is similarly applicable to assertions that check global properties such as domination, disjointness and ownership.

Formalization

We assume a standard programming language with concrete semantics that define the program state and the transitions between states. The program state has the local state of each thread and the shared program heap, defined in the usual way (see Table. 1).

TABLE 1

Semantic Domains for a Heap

| | |
|---|---|
| aobj ⊆ Objs | Allocated objects |
| v ∈ 2 Val = Objs ∪ {null, } ∪IN | Values |
| h ∈ Heap = Objs × FieldIds → Val | Heap |
| s ∈ Snapshots = Objs × SnapIds → Objs | Snapshots |
| as ⊆ SnapIds | Active snapshots |

A state is a tuple: $\sigma = \langle aobj_o, h_o, s_o, as_o \rangle \in ST$, where $ST = 2^{Objs} \times Heap \times Snapshots \times 2^{SnapIds}$. Here, FieldIds is a finite set of field identifiers and SnapIds is a finite set of snapshot identifiers. A state σ keeps track of the set of allocated objects ($aobj_o$), a mapping from fields of allocated objects to values ($h_o$), a mapping from an object and a snapshot identifier to a copied object ($s_o$) and a set of active snapshot identifiers ($as_o$). The first two state components, $aobj_o$ and $h_o$, are standard. We use the special value ⊥ to denote newly allocated objects (for a given snapshot identifier). The component $s_o$ is an instrumented part of the state and represents the snapshots of a given object, one snapshot for each active snapshot identifier. The set of active snapshot identifiers $as_o$ represents the identifiers of the snapshots that are currently being computed.

FIG. 5 shows the procedures that we introduce in order to support snapshots. We use o.f=nv and o.sid=s as a shortcut for respectively updating the current state into a new state σ where $h_\sigma$ (o, f)=nv and respectively $s_\sigma$ (o, sid)=s. Similarly, we use the shortcut c=o.sid for obtaining $s_\sigma$ (o, sid) in state σ.

The procedures are shown in set notation and for simplicity we assume that each procedure is executed atomically. The left column contains the procedures invoked by an active assertion with identifier sid. The right column contains the procedures invoked by the program. For any initial state init, no snapshots are active, i.e., $as_{init}$=null and the snapshots for all objects are set to null, i.e., ∀o; sid.$s_{init}$=null.

The procedure startSnapshot( ) is invoked by the program when a new assertion is triggered. If all of the snapshot identifiers are taken, then the procedure returns BUSY, which can be used by the program to block and try again later (or abandon this particular assertion). Otherwise, some snapshot identifier is selected and placed in the set of active identifiers.

In the procedure allocBarrier(o), for all of the active snapshots, the newly allocated object's snapshot is set to ⊥, meaning that this object is to be excluded from being snapshotted for any of the active snapshots.

The procedure writeBarrier(o, f, nv) is invoked by the program when it is about to modify the heap. The operation takes the object to be modified, the field of that object and the new value. Because there could be multiple active snapshots at the time the modification to the object occurs, the barrier first checks whether the object has been snapshotted for any of the currently active snapshots. If there is a snapshot identifier for which the object has not been snapshotted, then a new copy is created and subsequently that snapshot copy is stored for each of the active snapshots. This optimization enables multiple active snapshots to share the same snapshotted object. The object is updated with the new value. Note that if o.sid=⊥(i.e., the object is newly allocated), the object is not snapshotted for the active snapshot identifier sid.

The procedure processObject(o, sid) is invoked by the assertion every time it encounters an object in the heap. It checks whether the object was already snapshotted for sid and if so, obtains the snapshotted copy. Note that this procedure never encounters an object that has been allocated, that is, it is an invariant that o.sid≠⊥. This is because if a newly allocated object was stored in the heap, the object where it was stored would have been snapshotted by the write barrier. Traversal of the object proceeds as usual.

The procedure endSnapshot(o, sid) is invoked by the assertion when the snapshot computation finishes. Then, the snapshot identifier is deactivated and for all currently allocated objects, their snapshot copies, if any, are made unreachable (to be collected at some point later by garbage collection).

Implementation

The following describes an example implementation of our approach in one embodiment. The following implementation, however, does not limit the methodology of the present disclosure. That is, other implementation may be possible. The system may be implemented in Ekes RVM 3.1.1, and may include three major components:

Asynchronous assertion interface: The application issues a new assertion through an interface similar to futures. Once started, concurrent checks proceed asynchronously until they complete, or until the application chooses to wait for the result.

Copying write barrier: When an assertion starts, STROBE activates a special write barrier in the application code that constructs a snapshot of the program state. It copies objects as necessary to preserve the state and synchronizes snapshot access with the checker threads.

Checker thread pool: Checker threads pick up assertions as they are issued and execute them. Assertion checking code is written in regular Java™, tagged with an annotation that the compiler recognizes. The code is compiled with a read barrier that returns values from object snapshots, whenever they are present.

As a single checker thread can be quickly overwhelmed by even a modest number of asynchronous assertions, STROBE allows multiple asynchronous assertions to be active at the same time, and each has its own snapshot of the program state.

To implement multiple concurrent snapshots, in one embodiment of the present disclosure, each object is augmented with an additional position in its header to store a pointer to a forwarding array. This forwarding array contains a forwarding pointer for each checker thread, which holds the object snapshot for that checker. During object copying, synchronization between the application and the concurrent checkers is accomplished by atomically writing a sentinel value into the object header. Snapshot copies live in the Java™ heap and are reclaimed automatically by the garbage collector when either the assertion check is complete or the copied object becomes garbage. We modify the GC object scanning code to trace the forwarding array and its pointers in addition to the object's fields.

In general, we found the optimization of not snapshotting newly allocated objects brings benefits. The reason is that newly allocated objects are nearly always written to during their construction, and hence would normally need to be snapshotted. The snapshot fields of newly allocated objects were declaratively tagged with ⊥, indicating they need not be copied. In our implementation in one embodiment, we realize this by introducing a global counter, called the epoch, that is incremented each time a new assertion starts. Each new object is then timestamped with the epoch in which it was created. Then, in the write barrier, we copy an object only if its timestamp is earlier than the current epoch.

When an object is modified, the write barrier makes a copy for each active checker thread for which (a) the object is not newer than the start of the check, and (b) the object has not already been copied for that checker thread. Further, as shown earlier, another optimization is to allow multiple snapshots to share a single copy of an object. This optimization applies to any checking thread that is active, but has not already made a snapshot of that object.

We employ an additional optimization that helps the write barrier quickly identify objects that have already been copied. When an object is copied we update its timestamp to the current epoch. Subsequent writes to the same object within the same epoch will immediately fail the test for copying. Without this optimization every write to an object would have to check all slots in the forwarding array to decide if a copy needs to be made.

Code Example 4. Copy-on-Write Write Barrier

```
void writeBarrier(Object src, Object target, Offset offset)
{
    int epoch = Snapshot.epoch;
    if (Header.isCopyNeeded(src, epoch)) {
        // -- Needs to be copied, we are the copier
        // timestamp(src) == BEING_COPIED
        snapshotObject(src);
        // -- Done; update timestamp to current epoch
        Header.setTimestamp(src, epoch);
    }
    // -- Do the write (omitted: GC write barrier)
```

```
            src.toAddress( ).plus(offset).store(target);
        }
```

Code Example 5. Snapshot Synchronization

```
        boolean isCopyNeeded(Object obj, int epoch)
        {
            int timestamp;
            do {
                // -- Atomic read of current timestamp
                timestamp = obj.prepareWord(EPOCH_POS);
                // -- If in current epoch, nothing to do
                if (timestamp == epoch)
                    return false;
                // -- If someone else is copying, wait
                if (timestamp == BEING_COPIED)
                    continue;
                // -- ...until CAS BEING_COPIED succeeds
            } while (!obj.attempt(timestamp, BEING_COPIED,
            EPOCH_POS));
            return true;
        }
```

The write barrier is shown in Code Example 4 (slightly simplified from the actual code). All operations on the forwarding array (making or accessing copies) are synchronized using atomic operations on the object's timestamp. The write barrier first calls a method to determine if a copy is needed. The method is CopyNeeded( ) is shown in Code Example 5. It includes a loop that exits when either (a) the timestamp is current, so no copy is needed, or (b) the timestamp is older than the current epoch, so a copy is needed. In case (b) the code writes a special sentinel value BEING COPIED into the timestamp, which effectively locks the object. All other reads and writes are blocked until the sentinel is cleared. This code may be compiled inline in the application.

```
        void snapshotObject(Object obj)
        {
            // -- Get forwarding array; create if needed
            Object [ ] forwardArr = Header.getForwardingArray(obj);
            if (forwardArr == null) {
                forwardArr = new Object[NUM_CHECK_THREADS];
                Header.setForwardingArray(obj, forwardArr);
            }
            // -- Copy object
            Object copy = MemoryManager.copyObject(obj);
            // -- Provide copy to each active checker
            // that has not already copied it
            for (int t=0; t < NUM_CHECK_THREADS; t++) {
                if (isActiveCheck(t) && forwardArr[t] == null)
                    forwardArr[t] = copy;
            }
        }
```

Code Example 6. Copying Code

The snapshot code, shown in Code Example 6 (slightly simplified from the actual code), may be compiled out-of-line, since it is infrequent and relatively expensive. It first loads the forwarding array, creating one if necessary. It then makes a copy of the object using an internal fast copy (the same mechanism used in the copying garbage collectors). It installs a pointer to the copy in each slot of the forwarding array for which the corresponding checker thread is (a) active and (b) has not already copied the object. The read barrier in the checker threads checks to see if a copy of the object exists and uses it in place of the current state of the object. To avoid a race condition with the write barrier, it locks the timestamp and checks for a forwarding array. If one exists, it looks in its slot in the array for a pointer to a copy. If there is a copy in the slot it uses the snapshot copy; otherwise it performs the read on the original object.

Experimental Evaluation

Our technique in one embodiment may detect all the same errors that traditional synchronous assertions would catch. Our experimental evaluation explored the performance space of this technique in order to provide a sense of how well it works under a range of conditions. Our findings include:

Asynchronous checking performs significantly better than synchronous checking in almost all circumstances.

The overhead of making snapshots is quite low and grows slowly, primarily as a function of the number of concurrent inflight checks, which increases the copying costs.

Increasing the number of checker threads improves performance, as long as there is enough assertion checking work to keep the threads busy.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Parts of the program code may execute on the source and target servers of the migration.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The systems and methodologies of the present disclosure may be carried out or executed in a computer system that includes a processing unit, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen for presenting output displays and providing a display through which the user may input data and interact with the processing system, for instance, in cooperation with input devices such as the keyboard and mouse device or pointing device. The computer processing system may be also connected or coupled to one or more peripheral devices such as the printer, scanner, speaker, and any other devices, directly or via remote connections. The computer processing system may be connected or coupled to one or more other processing systems such as a server, other remote computer processing system, network storage devices, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems or on any single platform, for instance, accessing data stored locally or distributedly on the network.

Figure 3:
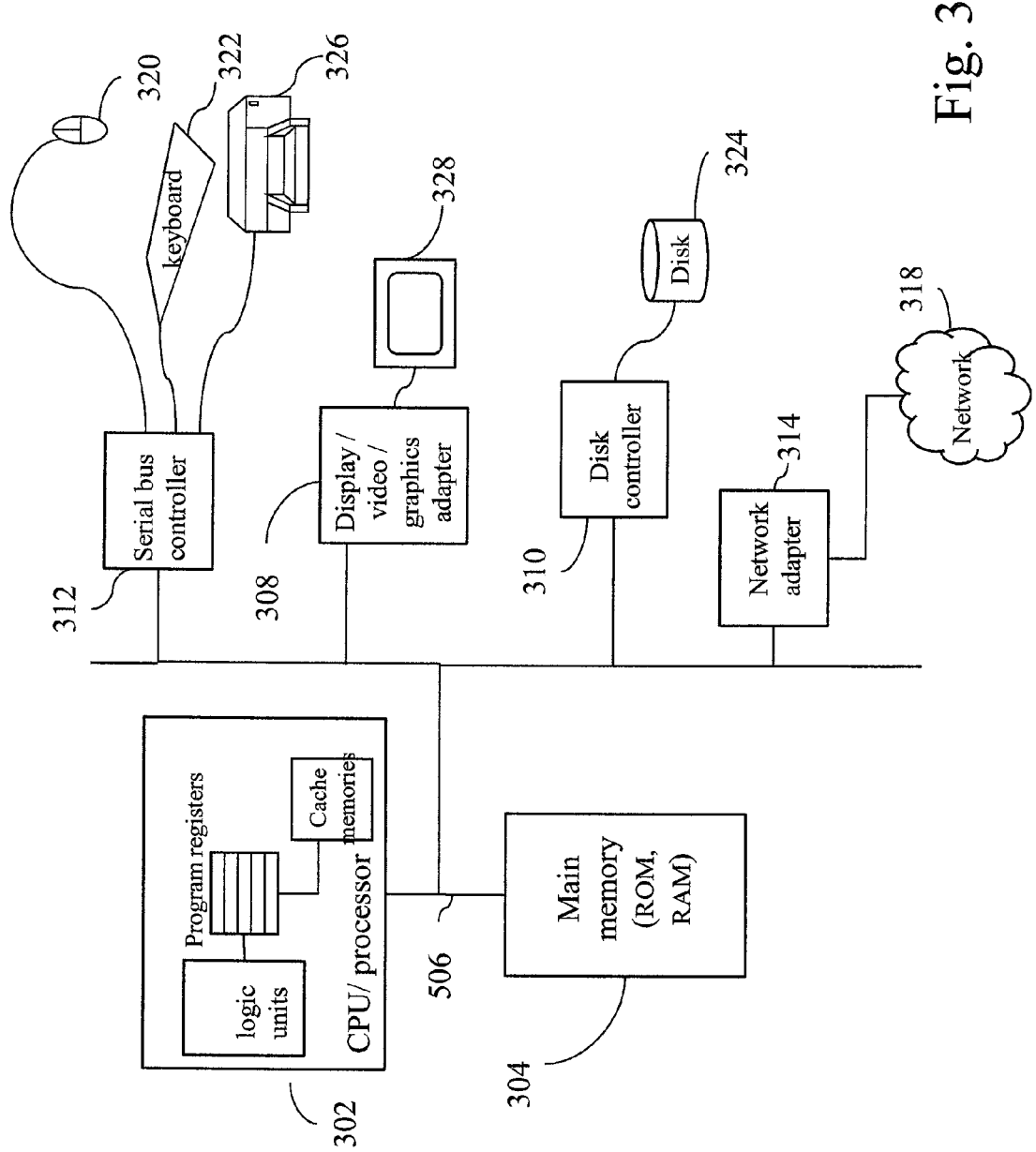
FIG. 3 illustrates an example of a computer system, in which the systems and methodologies of the present disclosure may be carried out or executed.

FIG. 3 illustrates an example computer system that may implement the system and/or method of the present disclosure. One or more central processing units (CPUs) 302 may include arithmetic/logic unit (ALU), fast cache memory and registers and/or register file. Registers are small storage devices; register file may be a set of multiple registers. Caches are fast storage memory devices, for example, comprising static random access (SRAM) chips. Caches serve as temporary staging area to hold data that the CPU 302 uses. Shown is a simplified hardware configuration. CPU 302 may include other combination circuits and storage devices. One or more central processing units (CPUs) 302 execute instructions stored in memory 304, for example, transferred to registers in the CPU 302. Buses 306, for example, are electrical wires that carry bits of data between the components. Memory 304 may include an array of dynamic random access memory (DRAM) chips, and store program and data that CPU 302 uses in execution. The system components may also include input/output (I/O) controllers and adapters connected to the CPU 302 and memory 304 via a bus, e.g., I/O bus and connect to I/O devices. For example, display/graphic adapter connects 308 a monitor 328 or another display device/terminal; disk controller 310 connects hard disks 324, for example, for permanent storage; serial controller 312 such as universal serial bus (USB) controller may connect input devices such as keyboard 322 and mouse 320, output devices such as printers 326; network adapter 314 connects the system to another network, for example, to other machines. The system may also include expansion slots to accommodate other devices to connect to the system. For example, a hard disk 324 may store the program of instructions and data that implement the above described methods and systems, which may be loaded into the memory 304, then into the CPU's storage (e.g., caches and registers) for execution by the CPU (e.g., ALU and/or other combinational circuit or logic). In another aspect, all or some of the program of instructions and data implementing the above described methods and systems may be accessed, and or executed over the network 318 at another computer system or device.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method for asynchronous assertions, comprising:
    detecting an asynchronous assertion in a program of instructions executing on a processor associated with an application;
    creating a snapshot of the application in response to detecting an asynchronous assertion in the program of instructions and in response to detecting one or more updates to one or more objects involved in the asynchronous assertion, the one or more updates occurring in the program of instructions after the detected asynchronous assertion, said one or more objects being modified to at least point to the snapshot, the snapshot of the application including one or more register states of the processor associated with the application and memory states of memory used by the application;
    allowing the program of instructions to continue executing;
    evaluating the asynchronous assertion based on the snapshot asynchronously to the program of instructions that continues to execute; and
    returning result of the evaluation to the program of instructions.

2. The method of claim 1, wherein the asynchronous assertion queries properties of the programs' heap.

3. The method of claim 1, wherein the asynchronous assertion is evaluated by a single thread.

4. The method of claim 1, wherein the asynchronous assertion query is evaluated by multiple evaluator threads.

5. The method of claim 1, wherein the result is delivered to the program after the assertion completes.

6. The method of claim 1, wherein multiple asynchronous assertions are active at the same time.

7. The method of claim 6, wherein each of the multiple asynchronous assertions has a snapshot of a program state of the program.

8. The method of claim 1, wherein newly created objects created after the asynchronous assertion becomes active, are not snapshotted.

9. A system for asynchronous assertions, comprising:
    one or more processors;
    an application running on the one or more processors;
    a module operable to detect an asynchronous assertion in the application and further operable to create a snapshot of the application in response to detecting the asynchronous assertion in the application and in response to detecting one or more updates to one or more objects involved in the asynchronous assertion, the one or more updates occurring in the application after the detected asynchronous assertion, said one or more objects being modified to at least point to the snapshot, the snapshot of the application including one or more register states of the processor associated with the application and memory states of memory used by the application, the memory states including one or more objects used in the application, the module further operable to evaluate the asynchronous assertion based on the snapshot asynchronously to the application that continues to execute, and return result of the evaluation to the application.

10. The system of claim 9, wherein the asynchronous assertion is evaluated by a single thread.

11. The system of claim 9, wherein multiple asynchronous assertions are active at the same time.

12. The system of claim 11, wherein each of the multiple asynchronous assertions has a snapshot of a program state of the application.

13. The system of claim 1, wherein newly created objects created after the asynchronous assertion becomes active, are not snapshotted.

14. A non-transitory computer readable storage medium storing a program of instructions executable by a machine to perform a method for asynchronous assertions, comprising:

detecting an asynchronous assertion in a program of instructions executing on a processor associated with an application;

creating a snapshot of the application in response to detecting an asynchronous assertion in the program of instructions and in response to detecting one or more updates to one or more objects involved in the asynchronous assertion, the one or more updates occurring in the program of instructions after the detected asynchronous assertion, said one or more objects being modified to at least point to the snapshot, the snapshot of the application including one or more register states of the processor associated with the application and memory states of memory used by the application;

allowing the program of instructions to continue executing;

evaluating the asynchronous assertion based on the snapshot asynchronously to the program of instructions that continues to execute; and returning result of the evaluation to the program of instructions.

15. The computer readable storage medium of claim 14, wherein the asynchronous assertion queries properties of the programs' heap.

16. The computer readable storage medium of claim 14, wherein multiple asynchronous assertions are active at the same time.

17. The computer readable storage medium of claim 16, wherein each of the multiple asynchronous assertions has a snapshot of a program state of the program.

18. The computer readable storage medium of claim 14, wherein newly created objects created after the asynchronous assertion becomes active, are not snapshotted.

19. The computer readable storage medium of claim 14, wherein the creating a snapshot includes creating a snapshot in response to detecting a change in one or more objects used by the application occurring after the asynchronous assertion is detected.

* * * * *